Feb. 21, 1939.                J. L. PERKINS                2,147,920
                              TRANSMISSION
                           Filed Jan. 25, 1938
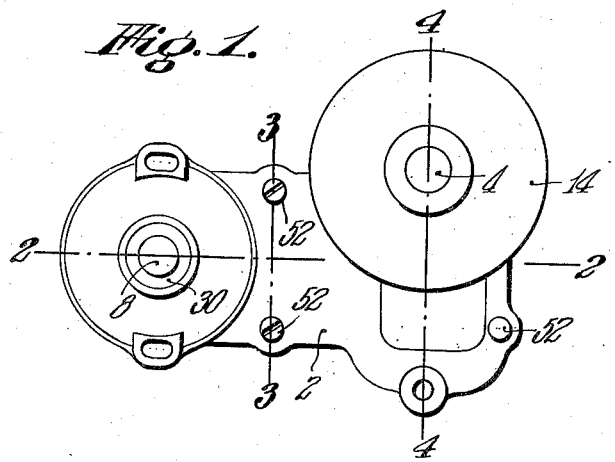
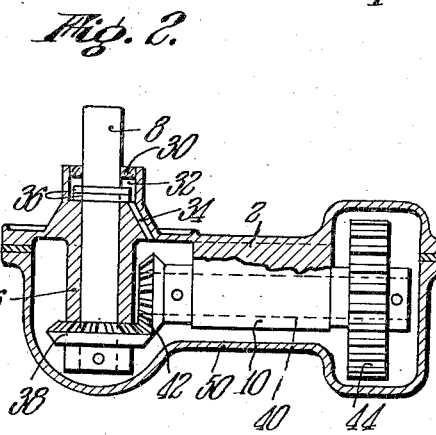
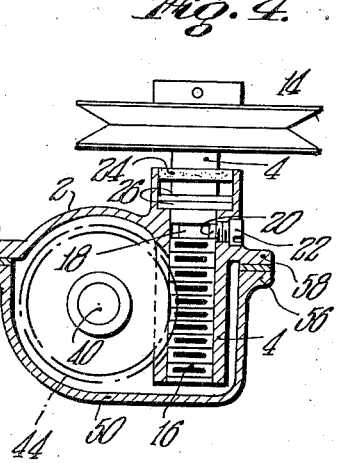
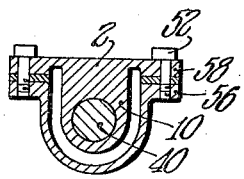
INVENTOR.
Julian L. Perkins.
BY Walter C. Ross.
ATTORNEY.

Patented Feb. 21, 1939

2,147,920

UNITED STATES PATENT OFFICE 2,147,920

TRANSMISSION

Julian L. Perkins, West Springfield, Mass.

Application January 25, 1938, Serial No. 186,827

1 Claim. (Cl. 74—606)

This invention relates to improvements in transmission apparatus and the principal objects of the invention are directed to the provision of a transmission apparatus which is simple and compact in form so as to occupy but a small amount of space, while at the same time there is provided an apparatus which is characterized by its efficiency.

Various novel features and advantages of the invention will be hereinafter more fully referred to in connection with the accompanying description of the invention in the form at present preferred with reference to the accompanying drawing wherein:

Fig. 1 is a plan view of a transmission apparatus embodying the novel features of the invention;

Fig. 2 is a longitudinal, sectional elevational view of the line 2—2 of Fig. 1;

Fig. 3 is a transverse sectional elevational view of the line 3—3 of Fig. 1; and Fig. 4 is a transverse sectional elevational view of the line 4—4 of Fig. 1.

Referring now to the drawing in detail the invention will be fully described.

A support member is represented by 2 which has a vertically disposed bearing 2 for a shaft 4 and a vertically disposed bearing 6 for a shaft 8 both depending from said support. A horizontal bearing 10 also extends downwardly from the support 2.

The transmission is adapted for use in connection with a domestic washing machine where the unit must be small, of low cost, efficient in operation and substantially noiseless.

To that end the bearings are carried by support 2 so that they are securely tied against any objectionable relative movements. The shaft 4 may be driven from a belt in engagement with a pulley 14 which is affixed thereto and the lower end of the shaft 4 is formed with threads 16 to provide a worm. A reduced portion 18 of the shaft receives the end portion 20 of a screw 22 in engagement therewith to prevent axial movement of the said shaft 4. The shaft 4 is sealed at its upper end by a washer 24 which may be of fibrous material or the like and other washers 26 are provided therebelow.

The shaft 8 is arranged for connecting to a shaft in the wringer column of a washing machine and it is sealed by a washer 30 at the upper side of an oil reservoir 32 which has a passageway 34 extending downwardly therefrom. Washers 36 are provided on the shaft 8 to hold it against axial movement downwardly and a gear 38 on the lower end abuts the bearing 6 to prevent upward movement of the said shaft. A shaft 40 in the intermediate bearing 10 has a gear 42 in mesh with the gear 38 and a worm wheel 44 in engagement with the worm 16 of the shaft 4.

A cover 50 is provided to enclose the parts described and it may be secured to the support 2 by screws 52 associated with flanges 56 of the cover and 58 of the support, there being a gasket 60 between said flanges so that the support and cover provides a tight casing which may hold lubricant.

It will be noted that the bearing being associated with the support are rigidly tied together and held against relative movement. This is to be distinguished from a construction where bearings for cooperating shafts are associated with separate members. Thereby by associating the bearings in the way described the support may be economically and accurately machined so that there is no necessity for a lining or carefully assembling separate parts in order to bring their bearings into the desired and correct alignment.

The support 2 and cover are formed to closely follow the contour of the parts within the casing formed thereby all to the end that the desired compactness is attained.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

A unitary transmission for a washing machine or the like comprising in combination, a support having a horizontally disposed flange therearound and vertically disposed bearings adjacent opposite ends thereof integral therewith and depending downwardly therefrom below the plane of said flange, separate vertical shafts rotatable in said bearings, an intermediate bearing integral with and depending downwardly from said support having a horizontal bore, a horizontal shaft in said bore, interengaging members on the opposite ends of said horizontal shaft and on the lower ends of said vertical shafts, a cup-shaped cover member extending below said interengaging members and upwardly therearound to said support provided with a horizontal flange abutting the flange of said support, and means securing said flanges together, the said support and cover forming a closed compartment for said horizontal shaft, interengaging members and bearings.

JULIAN L. PERKINS.